Sept. 13, 1966   R. W. ASBURY, SR   3,272,539
CONDUIT FITTING
Filed April 6, 1964   2 Sheets-Sheet 1
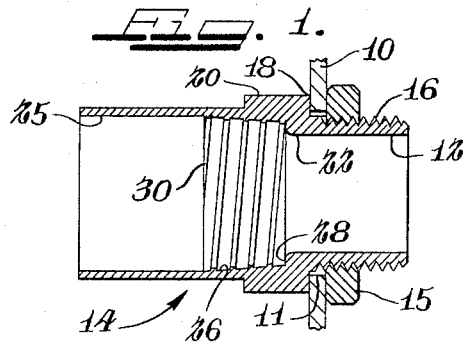
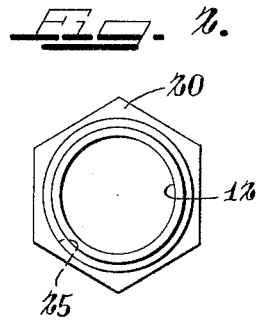
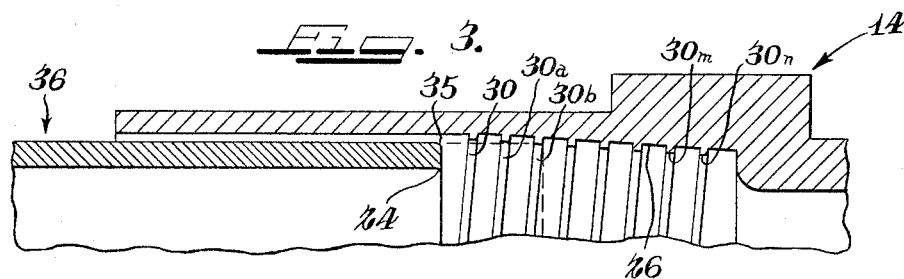
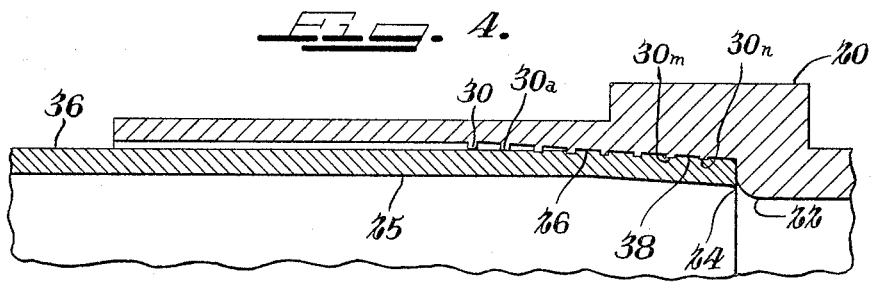
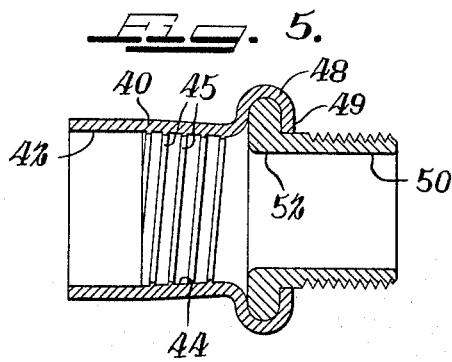
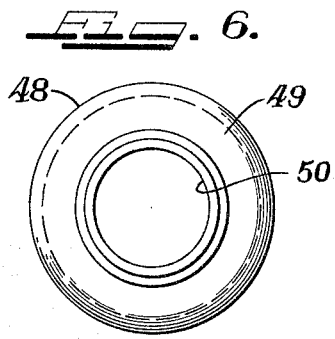
INVENTOR.
RAY W. ASBURY, SR.
BY
Fidler, Bradley, Patnaude &
Petherbridge Attys.

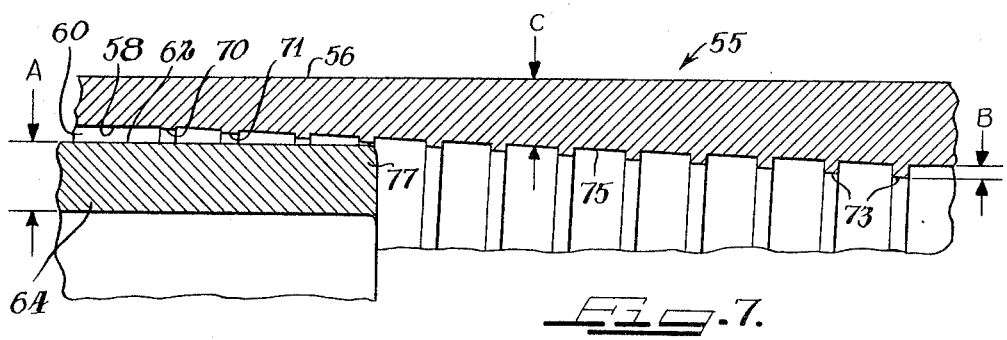
FIG. 7.
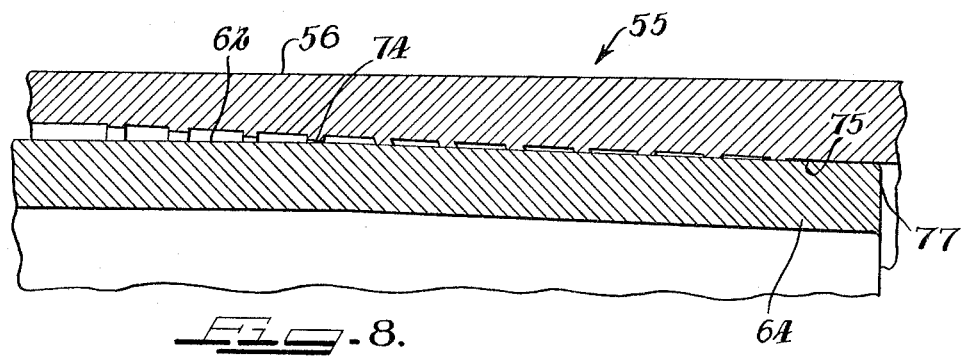
FIG. 8.
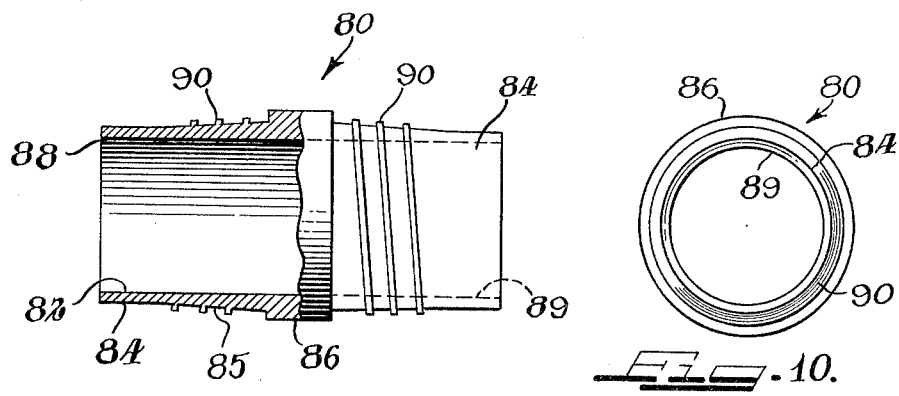
FIG. 9.
FIG. 10.

United States Patent Office 3,272,539
Patented Sept. 13, 1966

3,272,539
CONDUIT FITTING
Ray W. Asbury, Sr., 222 Birch Place, Kewanee, Ill.
Filed Apr. 6, 1964, Ser. No. 357,694
5 Claims. (Cl. 285—332.4)

The present invention relates to improvements in conduit fittings, and more particularly to a conduit fitting adapted for ready attachment to both thin wall and rigid conduit (sometimes termed raceways), and still more specifically to a conduit fitting having a helical land that serves to draw in the tubing, which land at the end thereof, at least, is displaced by material comprising the conduit.

Present day steel tubular conduit is made of cold rolled seam-welded strip steel and normally has an electro-galvanized exterior and an enameled interior. It is normally furnished in trade sizes from ½″ diameter to 2″ nominal diameter which diameters actually have decimal diameters of 0.706 and 2.197, respectively. However, it is found that these tubes do not have such exact dimensions. For example, in addition to eccentric deviations (oval shapes), the average outside diameter in each size can vary by plus or minus 0.005″. Accordingly, the average total diameter can vary by approximately 0.010″. Conduit is also furnished in aluminum which can be made by different processes and, because of its inherent corrosion resistance, does not require plating or enameling. Aluminum normally is kept to somewhat closer tolerances, particularly when the aluminum is extruded.

Present day conduit connectors are furnished with several different devices for connecting same. The rigid conduit has a relatively thick wall normally threaded with standard pipe threads such as used in plumbing. The thin wall conduit, however, cannot be threaded because it will then not retain a minimum tensile strength required in such fittings, which tension may be several hundred to a few thousand pounds in the different sizes of conduit depending upon the diameter thereof. Inasmuch as threading is not tolerable, the thin wall fittings have been coupled by different friction connections such as friction gland type fittings, set screws, and the like. When the thickness of the wall approaches a minimum wall thickness of .040″ thickness in aluminum, there is insufficient strength of these gland and set screw types of connections to meet the pull-out force in pounds, which according to Underwriters' Laboratories specifications is as follows:

Pullout

A threadless fitting shall be capable of withstanding without injury and without pulling loose from the raceway, for a period of one minute, a direct pull of the value indicated in the following table.

| Trade size of fitting in inches | Pullout force in pounds | |
|---|---|---|
| | E.M.T. | Rigid conduit |
| ½ | 300 | 700 |
| ¾ | 450 | 1,000 |
| 1 | 600 | 1,200 |
| 1¼ | 700 | 1,500 |
| 1½ | 800 | 1,700 |
| 2 | 1,000 | 2,000 |
| 2½ | --------- | 2,000 |
| 3 | --------- | 2,000 |
| 3½ | --------- | 2,000 |
| 4 | --------- | 2,000 |

Raintightness

A raintight threadless fitting assembled to a length or lengths of raceway in the intended manner shall not permit the entrance of water when the assembly is exposed for a period of one hour to a water spray adjusted to be approximately the equivalent of a beating rain.

Prior known fittings, in use at the present time, of the raintight type on thinwall (E.M.T.) and rigid conduit, are all made of three separate pieces. There is a body, a gland ring, and a gland ring nut. In contradistinction to this, the fitting to be described is not thus restricted, and can be of one piece, two pieces, or a convenient other number of pieces assembled to form, essentially, a one-piece fitting. These new fittings can be made of steel, aluminum, zinc base die cast, or other suitable metals or plastic materials, or the like. The land, or lands, on same can be right or left-hand, or both, as best suits the desired end uses for same.

The present fitting is characterized by a generally tubular fitting having a conduit guide portion for a short length and a tapered portion contiguous to the guide portion. The guide portion is adapted to either exceed or be less than the diameter of standard conduit maximum external or minimum internal dimension by a few thousandths of an inch, depending upon whether the fitting connects to the exterior or interior of the conduit end. The tapered portion is substantially frusto-conical for a length of approximately ⅝ of an inch and is of larger diameter than the maximum outside diameter of standard tubing when the fitting is the female type. The minimum conical outside diameter of male type connectors, likewise, is less than minimum inside diameters of conduit.

The tubing is slipped into engagement with a very fine helical land on the tapered portion of the tubular member and is rotated thereon so that the tube will have purchase with several of the convolutions of the land to attain a progressively increasing driving force as the end of the conduit engages more of the lands successively upon entrance upon the tapered portion of the fitting. As the cut-off end of the conduit approaches the throat or center of the fitting, the force exerted by the multiple lands engaged is sufficient to permit the leading edge of the conduit to deform and replace the last of the lands to be engaged to such an extent that a tight completely circumferential metal-to-metal contact is obtained between the external diameter of the end of the tube and the internal diameter of the tapered portion of the fitting.

As mentioned briefly above, the device can be in the form of a coupling for running lengths of successive lengths of tubing, which is normally furnished in ten-foot lengths plus or minus ¼ of an inch. The fitting can be in the form of an elbow, offsets, or terminal box connectors, etc., but in each of such applications of this invention the attribute of the tapered spiral or helical land for providing the maximum tensile strength of a joint to exceed the minimum pull-out force in pounds specified by the Underwriters' Laboratories.

A significant attribute of this invention is that the axial force for applying the fitting is gradually increased as more convolutions of a land, or lands, are engaged by the end of the conduit; and further in that a watertight seal is attained by the end of the tubing adjacent the throat (or center) of the fitting. Raintightness is as set forth above for a threadless fitting.

Accordingly, it is a broad attribute of this invention to provide a new conduit fitting.

A more specific object of the invention is to provide a fitting having a tapered frictional self-contained attribute for drawing in an end of a conduit.

Another more specific object of the invention is to provide a helical land in a tapered portion of a fitting for pulling in the end of the conduit.

A further object in keeping with the preceding objects is to provide a fitting having a tapered helical land of sufficient strength to pull in the tubing, but of sufficient weakness at a portion of the helical land to provide for same being replaced by material of the conduit while the conduit is being drawn into the conduit by a plurality of other land convolutions.

A specific object of the invention is to provide an improved raintight threadless fitting of male and/or female type.

Other objects, features and advantages of my present invention reside in details of construction and will be either obvious or pointed out in the following specification and claims as read in view of the accompanying drawings in which:

FIG. 1 is a transverse sectional view of a female coupling employing a female to male terminal box connector fitting;

FIG. 2 is an end view of the fitting as removed from the box end without the securing nut;

FIG. 3 is an enlarged partial view of the end of the fitting for receiving an end of a conduit;

FIG. 4 is a view similar to FIG. 3, but showing the fitting assembled with the conduit;

FIG. 5 is a view of a two-piece modification of my invention made from a piece of conduit or other suitable tubing;

FIG. 6 is an end view looking toward the left at FIG. 5;

FIGS. 7 and 8 are enlarged views of a modification of the invention; and

FIGS. 9 and 10 are views of a further modification of a male to male type fitting.

Referring now more in detail to the drawings, in FIG. 1 a portion 10 of a wall of a terminal box has a hole 11 therein, usually filled by a knock-out, through which an externally threaded end 12 of a fitting 14 extends. A standard connecting nut 15 mates with threads 16 and may be provided with jamb-lock means, or the like, not shown. The fitting is drawn up tightly enough so that the exposed junction point 18 is abutted by the shoulder 20 on the fitting 14 with the external surface of the wall 10. The fitting 14 has a suitable throat 22 as required by the Underwriters' Laboratories for preventing a burr 24 (FIG. 3) caused by the cut-off tool for tubing from extending into the path of travel of wires within the tubing to protect the insulated covering thereof, as best illustrated in FIG. 4.

The fitting 14 has a substantially tubular portion 25 internal thereof and extending for a suitable distance to guide the end of a conduit thereinto into proper relationship with lands to be described below. The fitting 14 also has a tapered length or portion 26 which, in a three-quarter-inch diameter fitting for example, may extend axially above five-eighths of an inch adjacent the entrance shoulder 28 of the throat 22. The taper of the tapered portion 26 is frusto-conical and at an angle that can be expressed as approximately three-eighths of an inch per foot. It is believed worthy of note by way of comparison that standard plumbing pipe-taper is three-fourths of an inch per foot.

The tapered portion 26 contains a generally spiral land having a cross-sectional area of $\frac{1}{10,000}$ of a square inch; which is .010 across the face, times .010 in height. The lands can vary substantially from this and particularly in different sizes of fittings where the pull-out force in pounds does not require such size. However, it is to be noted that the pull-out force for a ¾" trade size rigid conduit fitting was exceeded by over 100%, which was the maximum capacity of the testing equipment used, that is, two thousand pounds which is required for such rigid conduit.

The lands 30, 30a, 30b, etc., to 30z for example, are each preferably between five to fifteen-thousandths of an inch, more or less, in width, and likewise five to fifteen-thousandths of an inch in height above the tapered surface 26. It is preferred that the convolutions 30, 30a and 30b, etc., proceed from zero at the start of the convolution 30 up to approximately ten-thousandths of an inch in width and height, as an average, after three or four initial convolutions. Thus the leading end 35 of the conduit generally indicated at 36 will readily enter into and lightly engage two or three of the convolutions 30, 30a and 30b, and pressure applied axially need not be high, but only on the order of a few ounces. Upon rotation of either the conduit 36 or the fitting 14, the fitting will move relatively toward the left with respect to the conduit 36, and the convolutions 30a, 30b, etc., will be deformed. The external wall of the conduit adjacent the leading edge 35 will be internally pressed in an extrusion-type function, but will not be cut to weaken even thin wall tubing.

Because of the taper of the portion 26 of the fitting 14, after several of the convolutions 30a and 30b have been engaged, there will be sufficient axial force available due to the number of engaged convolutions by the exterior surface of the end of the conduit 36 so that additional torque between the conduit 36 and the fitting 14 will cause convolutions 30m and 30n to be displaced to the extent that the exterior end surface 38 of the conduit 36 will be in raintight engagement with the interior of the fitting.

Referring now to FIGS. 5 and 6, a two-piece construction is shown comprising a length of tubing 40 formed with a tubular portion 42, a tapered portion 44 and lands 45 which may be identical to those discussed above in connection with FIGS. 1 through 4. The end of the tube 40 is first flared as at area 48 and thereafter gathered in at the end 49 in engagement with a second piece 50 to complete a terminal box connector substantially of the type and configuration of that described above, but made from thin wall tubular stock rather than thick wall tubular stock, as described in the modification above. This latter device can be made raintight, as necessary, inasmuch as the end of a conduit will pull up, and may engage a throat 52. It is not necessary to engage the throat 52, however, to be raintight. A conventional lock nut such as the nut 15, FIG. 1, will pull the surface 49 into raintight engagement with the external surface of a wall 10 of a terminal box wall 10.

Referring now to FIGS. 7 and 8, only a part of a connector 55 is shown having a conical threaded portion. An externally cylindrical sleeve 56 may have an internal diameter 58 providing a suitable clearance 60 between the internal diameter 58 and the external diameter 62 of conduit 64, or the like. The clearance 60, in this modification, can be very small on the order of a few thousandths of an inch, but can be as much as approximately twenty-thousandths of an inch maximum while still providing utility in this fitting.

Aluminum extrusion tubing is extruded through very precise extrusion dies and the external diameter 62 of such tubing, suitable for very thin wall conduit, can be held to close tolerances. Accordingly, fitting 55 is adapted for use with such aluminum tubing, as well as other metals, and plastics. With the latter, however, the extrusions have higher degrees shrinkage and, accordingly, the larger diameter will have tolerances between the different runs, and this fitting is particularly capable of accommodating such variations.

It is to be noted that the initially presented entrance lands 70, 71, etc., are shown as beginning at substantially no elevation from the internal diameter 58 and gradually increase to approximately ten-thousandths of an inch at the end lands 73. The intermediate lands may be gradually of both smaller internal diameter while being raised more from the internal surface in the tapered portion 75 thereof. As mentioned above in connection with the first modification, the modification now being described can accommodate a wider range of material and still do so with very small cross-sectional dimensions of the lands 70, 71 . . . 73. Again, the maximum height of the land is preferably approximately ten-thousandths of an inch, and the maximum face surface of same is approximately ten-thousandths of an inch wide. However, for use with different materials, these dimensions may vary to a substantial degree while still remaining within the teaching of this invention.

In the position shown in FIG. 7, the conduit 64 has entered and attained purchase at its leading external edge 77. Upon relative rotation of the conduit 64 in the proper direction with respect to the end 56 of the fitting 55, the leading edge 77 will be moved relatively toward the right in the end 55.

In FIG. 8, the leading edge 77 of the conduit 64 is shown as directly engaging the internal surface 75 of the tubular end 56 of the fitting 55. It is to be noted that beginning with the land 74, and proceeding along the land convolutions to the right thereof, that these lands are being intruded and are in turn intruding the surface 62 of the conduit 64. As the leading edge 77 enters the fitting 55 still further, there is an interference fit between the external surface 62 of conduit 64 and the internal surface 75 of the tapered portion of this fitting, and such can be fluid as well as liquid tight, and can withstand substantial pressure of either without leaking either inwardly or outwardly.

While the above two modifications of this invention have been directed to female type connectors, obviously male type connectors can likewise serve a useful purpose as, for example, a coupling 80 shown in FIG. 9, and in end view in FIG. 10. This coupler may be made of uniformly internal diameter stock in the form of tubular stock having a predetermined internal diameter 82 sufficient to provide for either rolling on or die cutting, or otherwise providing an external cylindrical guide surface 84, a tapered surface 85 and a predetermined spacer surface 86 that can be helical, octagonal, or round as shown, for best serving its intended end use. Considered as a conduit coupling, the internal ends 88 and 89 are preferably chamfered to provide a throat, as described above (FIG. 1), for facilitating pulling through electrical cable, and the like.

Both ends of this coupling 50 may be identical. While only three land convolutions 90 have been shown at each side, obviously many more can be provided, or less for some services. It is to be noted that twelve lands are shown in FIGS. 7 and 8 in the internally landed surface 75, and different numbers are preferred for different sizes of fittings further to accommodate and meet intended uses, as well as the Underwriters' specification for such devices, and further to provide gas or fluid tightness when the device is used as conductors for gasses and liquids, or as conduit is installed in dangerous atmospheres or under liquid surfaces, and the like.

With reference again to FIG. 7, a dimension A is shown, which in connection with the very thin wall conduit is about forty-thousandths of an inch. The space 60 is indicated at approximately similar scale as being approximately ten-thousandths of an inch; and the dimension B at the right-hand side of the figure is the land height dimension which, as indicated, is approximately ten-thousandths of an inch. The dimension C at a particular point in the taper 75 shown is approximately forty-thousandths of an inch, but this dimension is exceeded at the right of the dimension C and may be less than this dimension in the entrance of the cylindrical guide end of this fitting. Other modifications may be similarly dimensioned, and a material saving is affected by keeping these dimensions within suitable minimum limits capable of meeting requirements and desideratum for use of these connectors.

Other uses of these devices are being found, for example, as temporary jigs which can be suitably mounted in tubes which facilitate automatic operation, and in which landed ends serve as work supporting standards or devices to be run through brazing machines, and the like, and into which pieces to be brazed can be inserted and accurately aligned. With reference to FIG. 1 (as well as others), the surface 10 can be rotated ninety degrees with the female end of the fitting upward and the surface 10 representing a belt, or the like, to pass articles to be brazed through a brazing machine or soldering machine, or the like. The coupling can either be placed on suitable cylindrical supports or in themselves be provided with suitable supports for in turn supporting work pieces. This device has utility for such services, as well as for a connector for conduit, tubing, pipe, and the like.

Raintightness has been emphasized in the description above. Obviously, for out-of-the-weather connectors, such tightness may not be required. Further, while a few different types of helical lands have been described, differently arranged but functionally similar lands will occur to others working in the art.

While I have shown and described in detail a preferred embodiment of the present fitting and a few alternates thereof, obviously several adaptations of the broad concept of the invention will be made by others skilled in the art. Accordingly, I desire not to be limited in my invention only to the specific embodiment shown and described but by the scope and spirit of the following claims.

I claim:

1. In combination, a conduit having an end, a generally continuous cylindrical surface having a constant diameter on said end, a fitting comprising a body having a generally central axis, a portion on said body tapered along said central axis, said tapered portion having a first diametral dimension greater than said cylindrical surface and a second diametral dimension less than said cylindrical surface, and spiral land means on said tapered portion drivingly cooperable with said cylindrical surface for securing together said fitting and said conduit upon relative rotation of said fitting and said conduit, said land means having a cross-sectional shape and size so as to be deformed by said cylindrical surface to cause said surface to engage said tapered portion completely around said cylindrical surface upon securement of said fitting and said conduit.

2. The combination generally as set forth in claim 1, said fitting having means for securing same and said conduit connected therewith to connectors of known kinds.

3. The combination generally as set forth in claim 1, said spiral land means being generally helical and comprising a plurality of convolutions.

4. The combination generally as set forth in claim 1, said land means having greater height in one part of said tapered portion than in another part of said tapered portion.

5. The combination generally as set forth in claim 1, said height being lesser adjacent a first position of initial engagement with said conduit and greater at a second position spaced from said first position.

References Cited by the Examiner

UNITED STATES PATENTS

| | | | |
|---|---|---|---|
| 166,735 | 8/1875 | Walworth | 285—382.2 |
| 567,000 | 1/1898 | Higbee | 285—390 X |
| 2,073,338 | 3/1937 | Durkee | 285—382.2 X |
| 2,147,343 | 2/1939 | Hokanson | 285—332.4 X |
| 2,152,962 | 4/1939 | Ice | 285—40 |
| 2,254,503 | 9/1941 | Thomas | 285—40 |
| 2,441,055 | 5/1948 | Babigian | 285—390 |
| 2,465,556 | 3/1949 | Taylor | 285—40 |
| 2,580,818 | 1/1952 | Mundy | 285—40 |
| 3,114,566 | 12/1963 | Coberly | 285—18 |
| 3,149,860 | 9/1964 | Hallesy | 285—18 |
| 3,158,390 | 11/1964 | Woodling | 285—334 |

CARL W. TOMLIN, *Primary Examiner.*

R. GIANGIORGI, *Assistant Examiner.*